United States Patent
Skvarla et al.

(10) Patent No.: US 6,604,389 B2
(45) Date of Patent: Aug. 12, 2003

(54) WOBBLE JOINT

(75) Inventors: William Paul Skvarla, Saginaw, MI (US); Leland Nels Olgren, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/255,358

(22) Filed: Sep. 26, 2002

(65) Prior Publication Data

US 2003/0061846 A1 Apr. 3, 2003

Related U.S. Application Data

(60) Provisional application No. 60/325,626, filed on Sep. 28, 2001.

(51) Int. Cl.[7] .............................................. D06F 37/40
(52) U.S. Cl. ........................... 68/23.6; 68/23.7; 68/133; 74/650
(58) Field of Search ................. 68/23.6, 23.7, 68/131, 133; 74/60, 650

(56) References Cited

U.S. PATENT DOCUMENTS

| | | | | |
|---|---|---|---|---|
| 2,105,218 A | * | 1/1938 | Kirby | |
| 2,138,501 A | * | 11/1938 | Miller | |
| 2,511,263 A | * | 6/1950 | Hiscock | |
| 2,769,346 A | * | 11/1956 | Flocke | |
| 2,797,569 A | * | 7/1957 | Kirby | |
| 2,823,975 A | * | 2/1958 | Kirby | |
| 2,902,851 A | * | 9/1959 | Fields | |
| 2,944,415 A | * | 7/1960 | Smith et al. | |
| 3,263,459 A | * | 8/1966 | Bochan et al. | |
| 5,460,018 A | | 10/1995 | Werner et al. | 68/23.6 |
| 6,115,863 A | | 9/2000 | Mason et al. | 8/159 |
| 6,227,013 B1 | | 5/2001 | Wyatt-Smith | 68/134 |

* cited by examiner

*Primary Examiner*—Frankie L. Stinson
(74) *Attorney, Agent, or Firm*—Edmond P. Anderson

(57) ABSTRACT

A wobble joint for use in automatic washing appliances and the like includes inner, outer and intermediate joint members which have nesting curved sliding surfaces that enable the joint members to pivot relative to one another. The joint has motion limiting features acting between the intermediate joint member and each of the inner and outer joint members to restrict relative movement between the outer joint member and the intermediate joint member to pivotal movement within a first plane and to restrict relative movement of the intermediate member and inner joint member to pivotal movement within a second plane transverse to the first plane. The motion limiting features comprise first and second arcuate grooves extending parallel to the first and second planes and retainers captured in the grooves and relatively moveable therealong.

16 Claims, 9 Drawing Sheets

WOBBLE JOINT

The disclosure incorporates the wobble joint disclosed in provisional patent application 60/325,626, filed Sep. 28, 2001, whose priority is claimed for this application.

TECHNICAL FIELD

This invention relates generally to mechanical joints, and particularly wobble joints wherein one joint member is able to wobble or gyrate about an axis of another joint member through restricted motion of the connection of the joint members.

BACKGROUND OF THE INVENTION

U.S. Pat. No. 6,115,863 discloses an automatic washing appliance in which a wash plate is supported for wobbling movement within a wash basket for laundering cloths. FIG. 4 of this patent discloses a wobble joint which supports the wash plate for wobbling action during operation of the appliance. The joint is made up in total of at least 11 separate parts which, when assembled, operate to support the outer joint member for relative wobbling movement relative to the inner joint member.

It is an object of the present invention to simplify the manufacture and improve upon the performance of such wobble joints for use in washing appliances and other applications.

SUMMARY OF THE INVENTION

A wobble joint constructed according to a presently preferred embodiment of the invention comprises an outer joint member having a curved sliding surface, an inner joint member having a curved sliding surface, and an intermediate joint member disposed between the inner and outer joint members and having an outer curved sliding surface supporting the curved sliding surface of the outer joint member for relative pivotal movement of the outer and intermediate joint members, and an inner curved sliding surface supporting the curved sliding surface of the inner joint member for relative pivotal movement of the inner and intermediate joint members. The joint further includes mutually engaging motion limiting features acting between the intermediate joint member and each of the inner and outer joint members and restricting the relative pivotal movement of the outer and intermediate joint members to pivotal movement in a first plane containing an axis of either the outer or inner joint member which is supported against pivotal movement, and restricting the relative pivotal movement between the intermediate and inner joint members to pivotal movement within a second plane containing the axis and disposed transverse to the first plane. According to the invention, the motion limiting features include first and second arcuate grooves extending parallel to the first and second planes in combination with retainers captured within the grooves and relatively moveable there along to provide the restricted pivoting movement of the joint members.

The invention further contemplates an automatic washing appliance embodying the above-described wobble joint in which a wobble wash plate disposed within a wash basket is supported by the outer joint member for relative wobbling movement about the first joint member during operation of the appliance. The invention has the advantage of simplifying the construction of wobble joints by minimizing the required number of component parts required to support the joint members for relative wobbling movement.

The invention has the further advantage of reducing the cost and simplifying the manufacture of such wobble joints through the formation of curved sliding surfaces and mutually engaging groove and retainer features which eliminate the need to utilize separate pins and bearings to support the joint members as in the prior art described above.

The invention has the further advantage of providing a wobble joint that is more compact in size by eliminating the need to provide a gap or clearance between the joint members that is employed with the prior art joint. The nesting curved sliding surfaces of the joint members places the joint members in contact with one another and thus enables the joint to be made more compactly and with tighter tolerance than that of the known prior art wobble joints.

Another advantage of the present invention is that the tighter tolerance and sliding contact of the joint members reduces lash and thus noise associated with operation of the joint.

BRIEF DESCRIPTION OF THE DRAWINGS

The present invention will not be described, by way of example, with reference to the accompanying drawings, in which.

DESCRIPTION OF THE PREFERRED EMBODIMENTS

Figure 1:
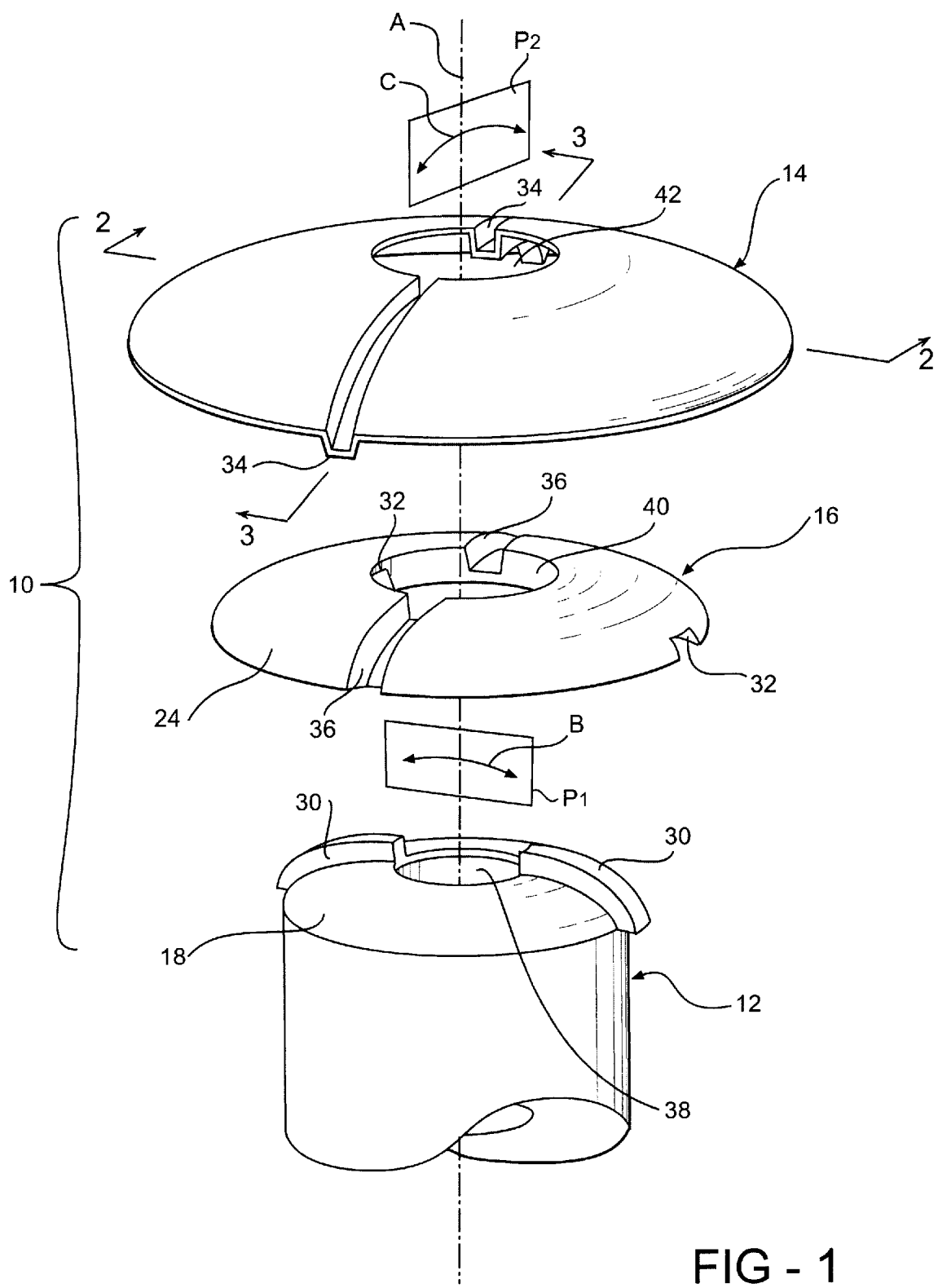
FIG. 1 is an exploded perspective view of a wobble joint constructed according to a first presently preferred embodiment of the invention.
Figure 2:
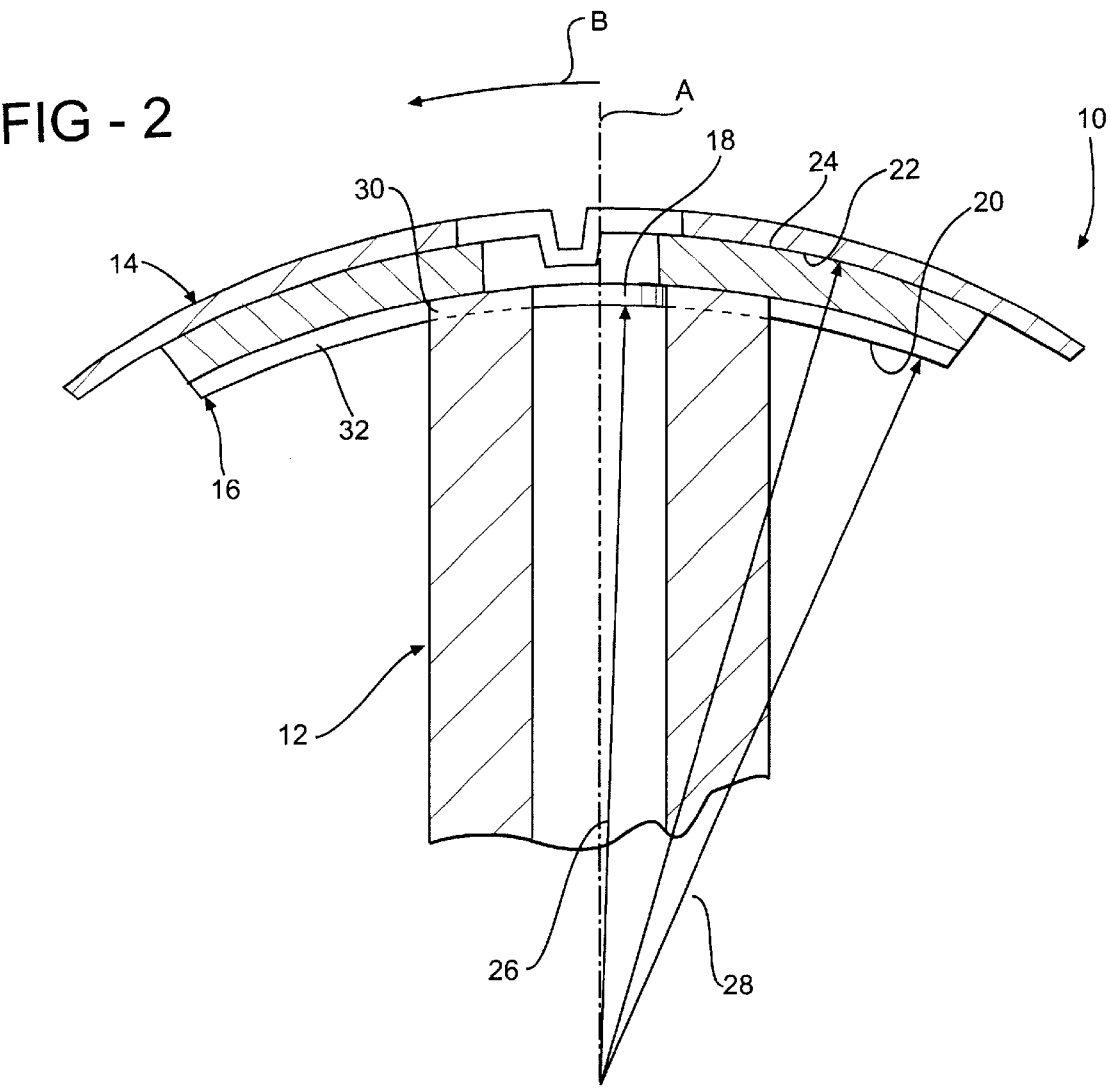
FIG. 2 is a fragmentary cross-sectional view taken generally along lines 2—2 of FIG. 1 with the intermediate joint shifted in the direction of arrow B relative to the inner joint.
Figure 3:
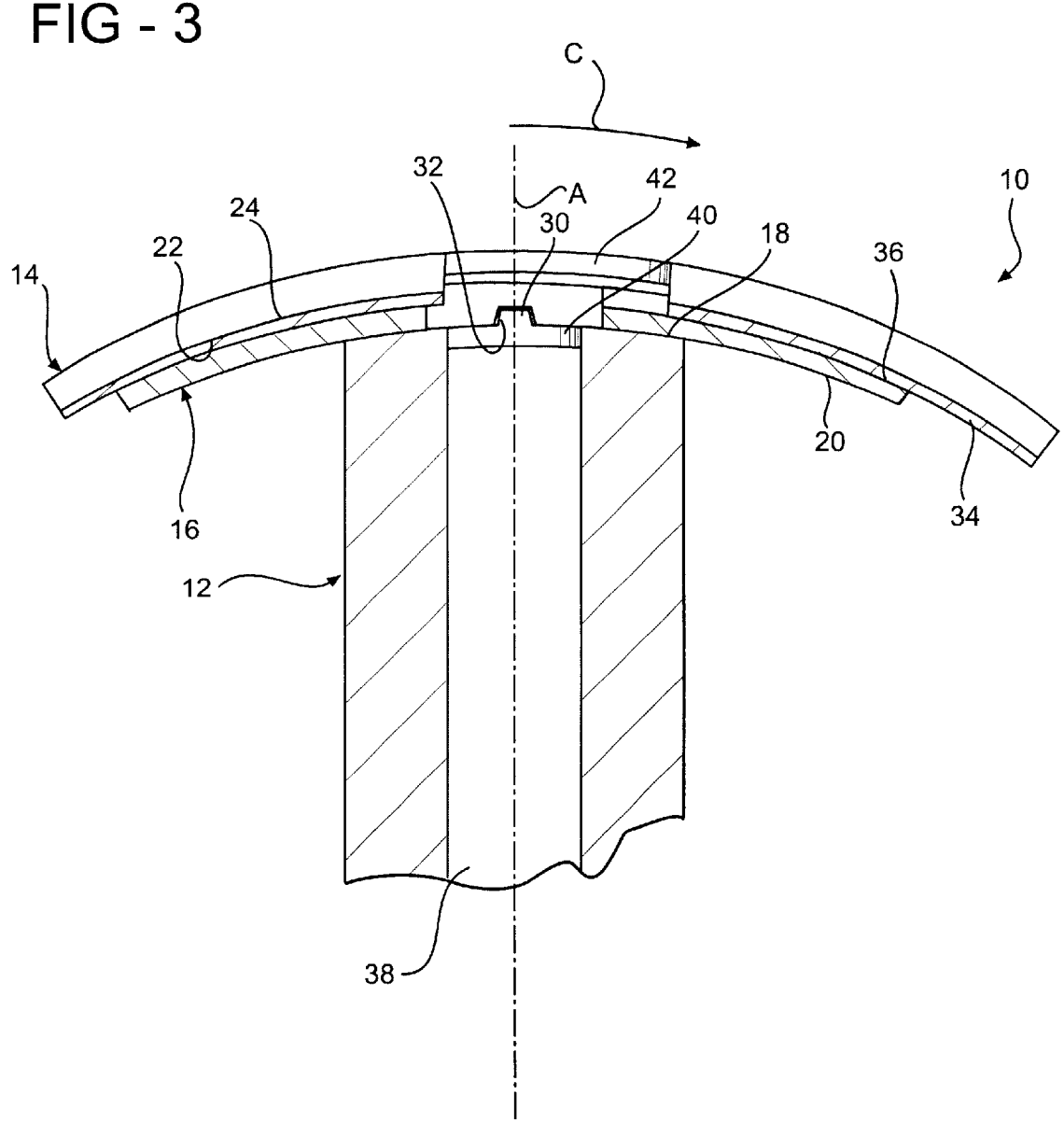
FIG. 3 is a view like FIG. 2 but showing the outer joint shifted in the direction of arrow C relative to the intermediate joint.
Figure 4:
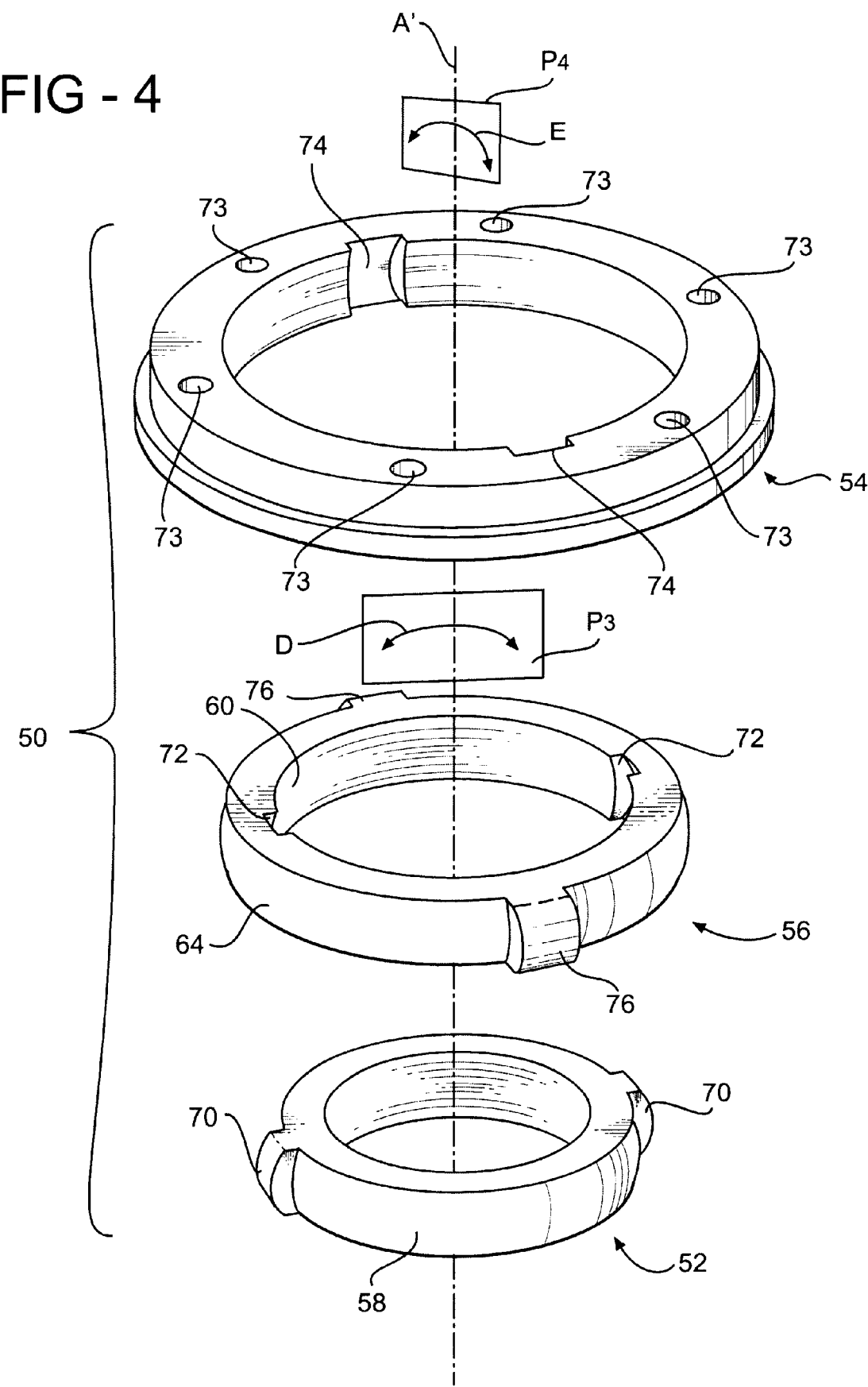
FIG. 4 is an exploded perspective view of a wobble joint constructed according to a second embodiment of the invention.

A wobble joint constructed according to a first embodiment of the invention is shown generally at 10 in FIGS. 1–3 and comprises an inner joint or race 12, an outer joint or race 14 and an intermediate joint or race 16 disposed about a common axis A.

The inner race 12 has a curved and preferably part-spherical surface 18 that nests with an associated curved and preferably part-spherical surface 20 of the intermediate race. The outer race 14 has a part spherical surface 22 that nests with an associated part spherical surface 24 of the intermediate race. The nesting surfaces 18, 20 and 22, 24 support the races 12, 14 and 16 for relative sliding pivotal movement about respective centers of curvature 26, 28 of the spherical surfaces 18, 20 and 22, 24. The centers of curvature 26, 28 are preferably the same.

The inner race 12 and intermediate race 16 have mutually engaging motion-limiting features 30, 32, respectively, which limit the sliding pivotal movement of the intermediate race 16 relative to the inner race 12 to one degree of freedom of motion in the direction of arrow B in a plane $P_1$ passing through the axis A. The outer race 14 and intermediate race 16 have mutually engaging motion-limiting features 34, 36, respectively. The features 34, 36 limit the sliding pivotal movement of the outer race 14 relative to the intermediate race 16 to one degree of movement in the direction of arrow C in a plane $P_2$ passing through the axis A which is transverse to the plane $P_1$ and preferably perpendicular thereto. With the inner race 12 held stationary, the outer race 14 is able to radially gyrate or "wobble" relative to the inner race 12 while being secured against rotation relative to the inner race 12 about the axis A.

The races 12, 14, 16 are preferably formed with openings or bores 38, 40, 42, respectively, that are in registry along the axis A for receiving a shaft (not shown). The opening 40 of the outer race 14 may be relatively larger in diameter than that of the openings 38, 42 of the inner and intermediate races 12, 16 to accommodate the sliding pivotal, wobbling movement of the outer race 14 without interference from the shaft (not shown).

The races 12, 14, 16, according to the first embodiment, are preferably stacked upon one another in the axial direction. The intermediate race 16 is stacked upon and overlies the inner race 12 and the outer race 14 is stacked upon and overlies the intermediate race 16 along the axis A. The outer race 14 has a cup-shaped concave inner surface that defines its part-spherical surface 22. The surface 22 mates with and is supported by an outer convex dome-shaped surface of the intermediate race 16 that defines its associated part-spherical surface 24. The intermediate race 16 has a cup-shaped concave inner surface that defines its other part-spherical surface 20. The surface 20 mates with and is supported by an outer convex dome-shaped surface of the inner race 12 that defines its associated part-spherical surface 18.

The motion limiting features 30, 32 of the inner race 12 and intermediate race 16 preferably comprise nesting ribs and grooves (or vise versa) that extend in the plane $P_1$. The motion limiting features 34, 36 of the outer race 14 and intermediate race 16 preferably comprise nesting ribs and grooves (or vise versa) that extend in the plane $P_2$. The motion limiting features may be machined or formed in the races. The motion limiting features are preferably arcuate and may have the same center of curvature as that of the part-spherical surfaces of the races. Of course, features other than nesting ribs and grooves that achieve the same purpose of providing restricted sliding pivotal movement of the races to attain non-rotative wobble movement of the outer race 14 relative to the inner race 12 is contemplated by this invention and are incorporated herein.

The inner race 12 and/or the outer race 14 may comprise integral parts of other components of a device. For example, the inner race 12 may form part of a stationary base or hub of the device and the outer race 14 may comprise a plate or other component supported for relative wobbling movement relative to the base or hub.

FIGS. 4–11 show a wobble joint 50 constructed according to a second embodiment of the invention. The wobble joint 50 includes an inner race 52, an outer race 54, and an intermediate race 56 having a common axis A'.

The inner race 52 has a part-spherical surface 58 that nests with a part-spherical surface 60 of the intermediate race 56. The outer race 54 has a part spherical surface 62 that nests with an associated part-spherical surface 64 of the intermediate race 56. The nesting surfaces 58, 60 and 62, 64 support the races 52, 54, 56 for relative sliding pivotal movement about respective centers of curvature 66, 68 of the mating surfaces 58, 60 and 62, 64. The centers of curvature 66, 68 are preferably the same.

Figure 5:
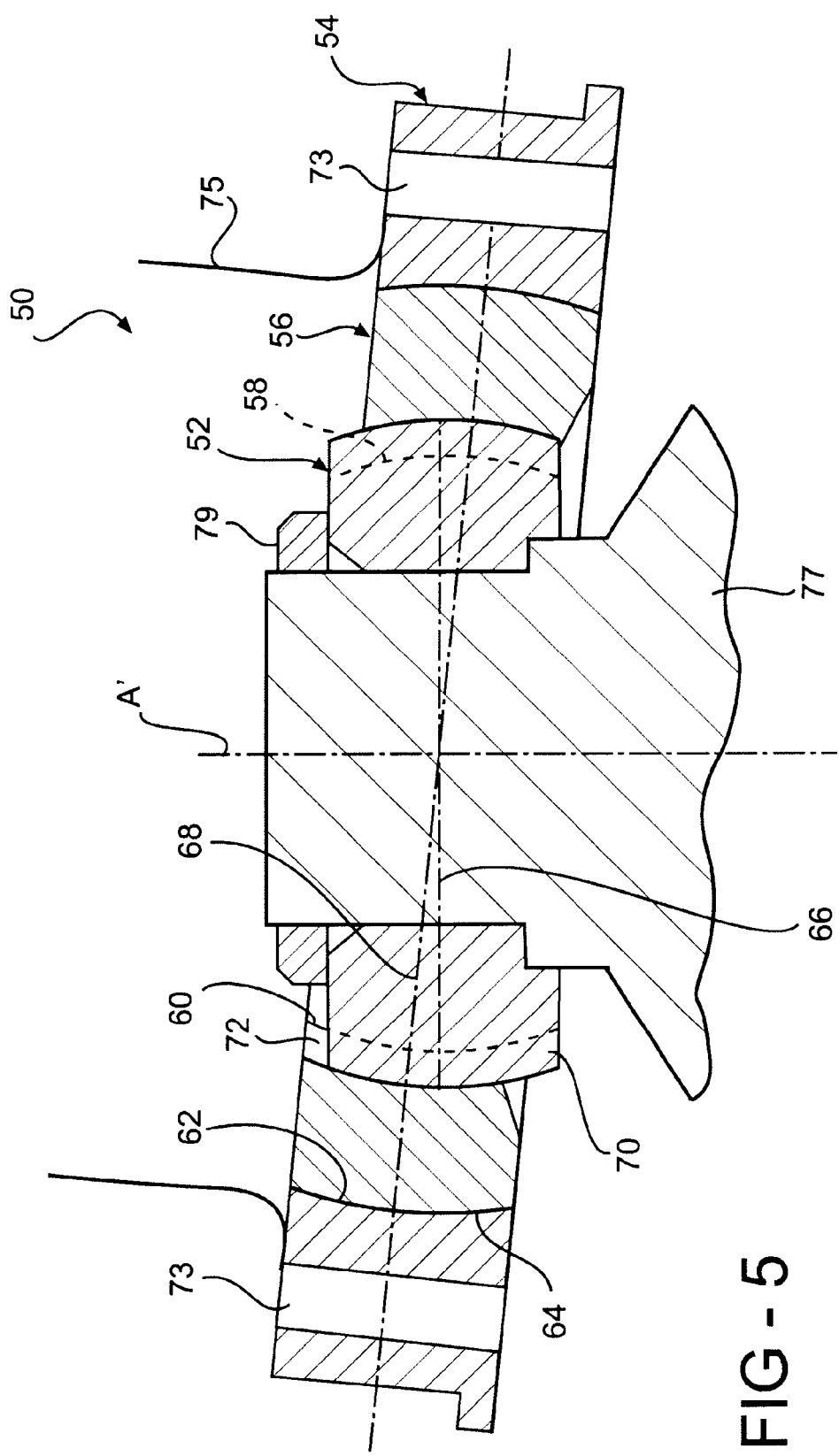
FIGS. 5 and 6 are enlarged fragmentary sectional views of the joint in FIG. 4 shown in two positions of relative movement of the joint members.
Figure 6:
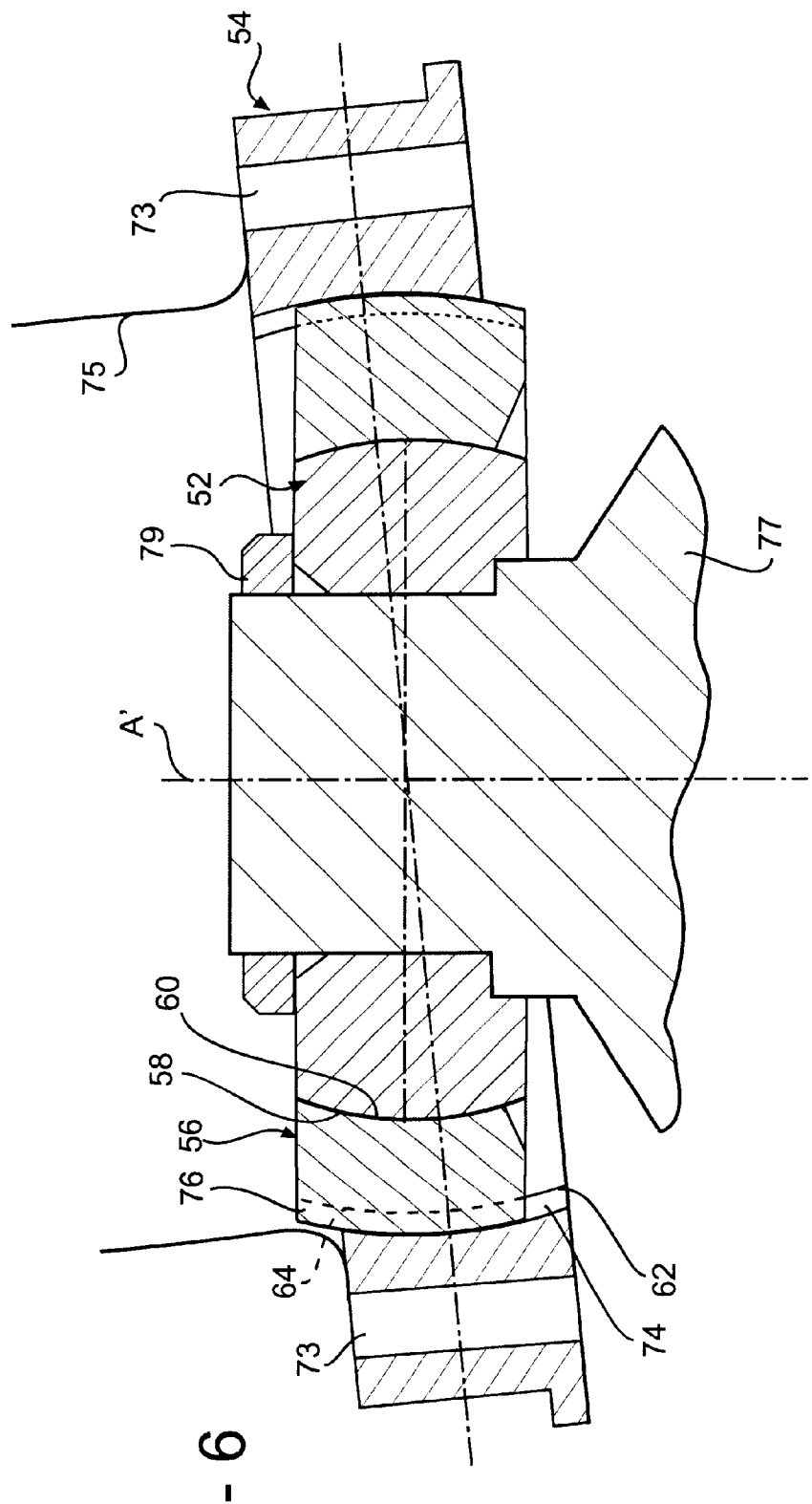
Figure 7:
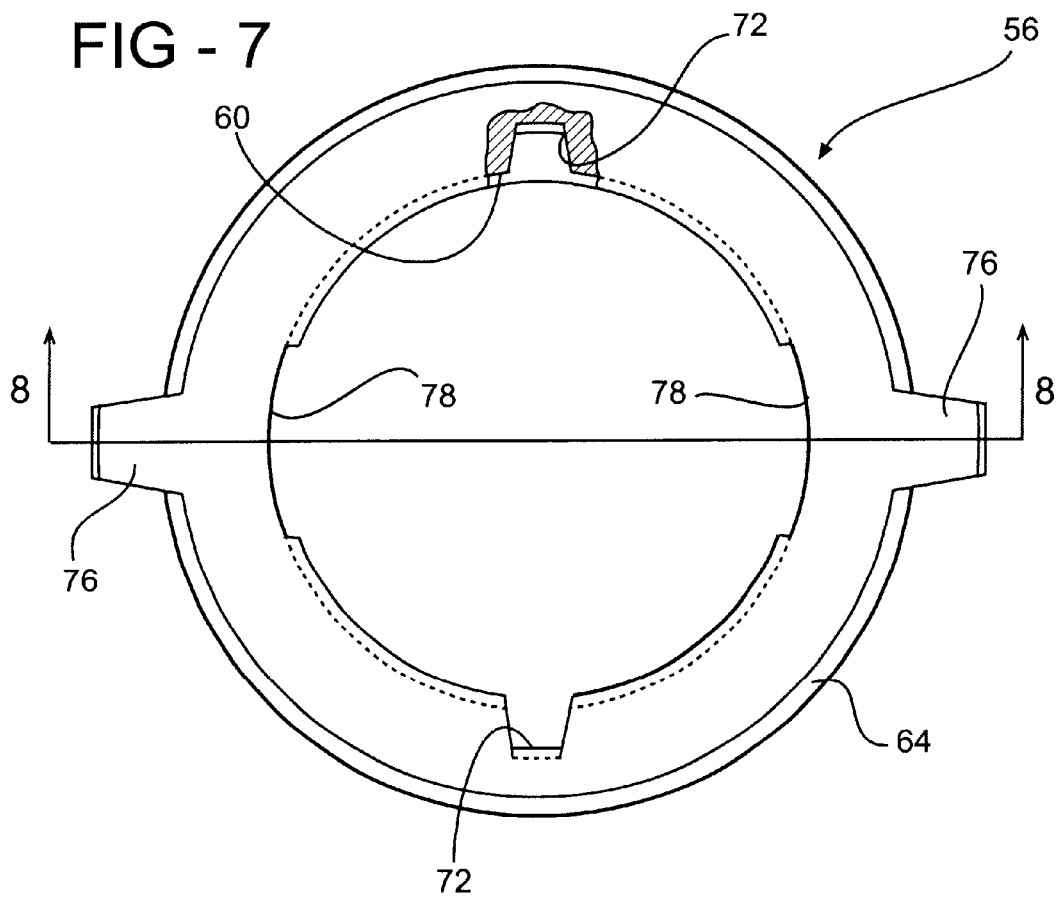
FIG. 7 is an enlarged plan view, shown partially broken away, of the intermediate joint member.
Figure 8:
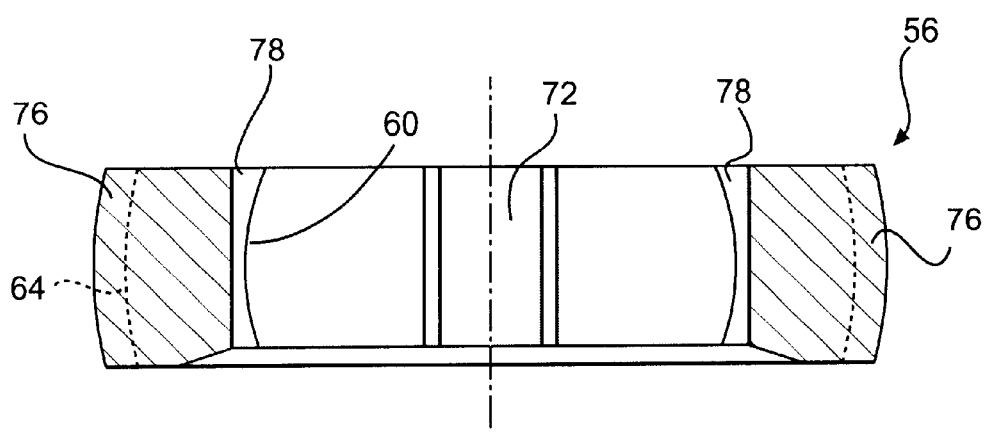
FIG. 8 is a cross-sectional view taken generally along lines 8—8 of FIG. 7.
Figure 9:
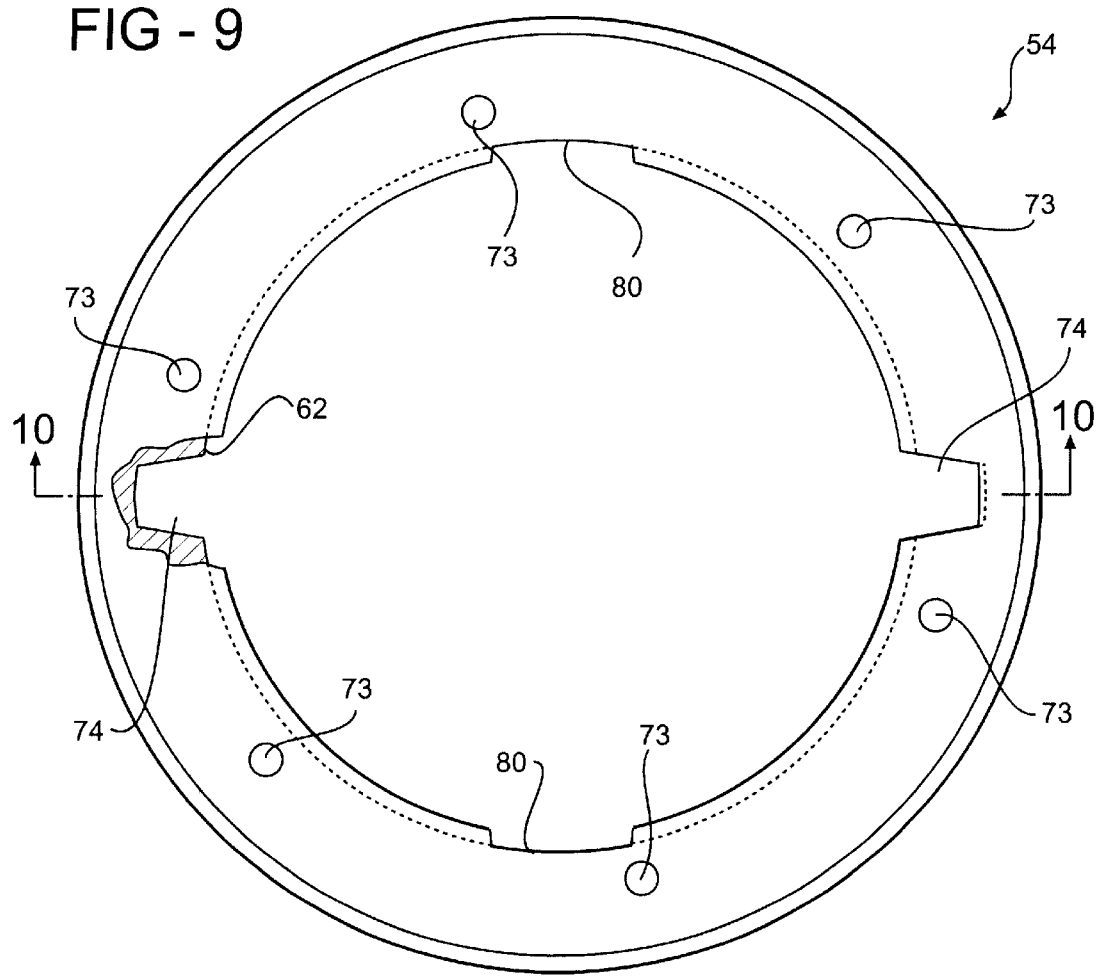
FIG. 9 is a plan view of the outer joint member shown partially broken away.
Figure 10:
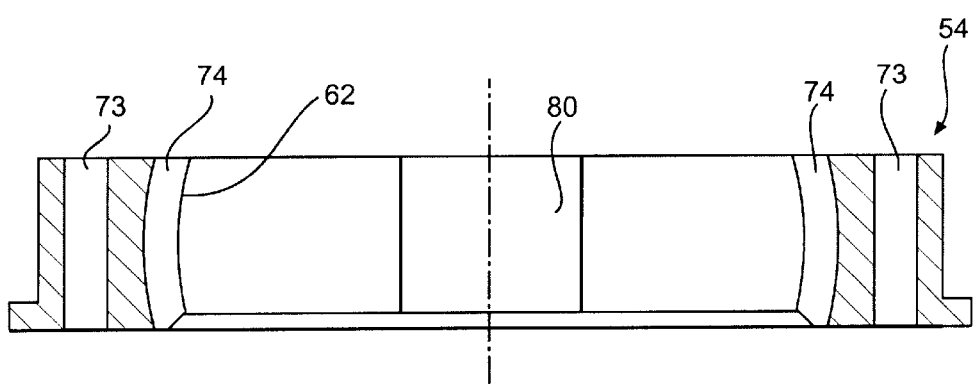
FIG. 10 is a cross-sectional view taken generally along lines 10—10 of FIG. 9.

The inner race 52 and intermediate race 56 have mutually engaging motion-limiting features 70, 72, respectively, that limit the sliding pivotal movement of the intermediate race 56 relative to the inner race 52 to one degree of freedom of motion in the direction of arrow D in a plane $P_3$ containing the axis A'. The outer race 54 and intermediate race 56 have mutually engaging motion-limiting features 74, 76, respectively. The features 74, 76 limit the sliding movement of the outer race 54 relative to the intermediate race 56 to one degree of freedom of motion in the direction of arrow E in a plane $P_4$ containing the axis A' and which is transverse and preferably perpendicular to the plane $P_3$. With the inner race 52 held stationary, such as mounted on a hub 77 by a retainer 79 as shown in FIGS. 5 and 6, the outer race 54 is able to radially gyrate or wobble relative to the inner race 52 while being supported against rotation about the axis A'. The outer race 54 may include mounting holes 73 or other mounting structure for mounting an object to be wobbled, such as a wash plate 75 of a washing machine.

The motion limiting features 70, 72 of the inner race 52 and intermediate race 56 preferably comprise nesting ribs and grooves (or vise versa) that extend in the plane $P_3$. The motion limiting features 74, 76 of the outer race 54 and intermediate race 56 preferably comprise nesting ribs and grooves (or vise versa) that extend in the plane $P_4$. The motion limiting features may be machined or formed in the races. The motion limiting features are preferably arcuate and may have the same center of curvature as that of the part-spherical surfaces of the races. Of course, features other than nesting ribs and grooves that achieve the same purpose of providing restricted sliding pivotal movement of the races to attain non-rotative wobble movement of the outer race 54 relative to the inner race 52 is contemplated by this invention and are incorporated herein As shown best in FIGS. 5–10, the races 52, 54, 56 are concentrically arranged rather than being axially stacked as with the first embodiment of FIGS. 1–3. The mating part-spherical surfaces are radially arranged. This has the advantage of providing a low axial profile package. Another advantage this second embodiment offers is that the races can be interlocked in a self-contained sub-assembly as shown in FIGS. 5 and 6. The mating surfaces are preferably provided with sufficient clearance to enable the races to be separately formed and then assembled with one another in the manner shown. To ease assembly, the mating surfaces and features may be formed with suitable relief regions to enable the intermediate race 56 to be installed about the inner race 52, and the outer race 54 about the intermediate race 56 as shown without impairing the operation of the joint 50. As shown best in FIG. 7, a slot or notch 78 may be formed in the intermediate race 56 of sufficient width and diametrical spacing to receive the inner race 52 end-wise into the intermediate race 56 such that their axes are initially perpendicular, after which the inner race 52 is rotated about 90 degrees to align their axes and fully engage and nest their part-spherical surfaces 70, 72. As shown best in FIG. 9, the outer race 54 is formed with a similar slot or notch 80 of sufficient width and diametrical spacing to receive the pre-assembled inner race 52 and intermediate race 56 endwise into the outer race 54, after which the intermediate race 56 is rotated about 90 degrees to align their axes and fully engage and nest their part-spherical surfaces 74, 76. Once assembled, the mating spherical forms of the races serve to interlock the races into a self-contained module. As an alternative or in addition to the notches 80, one or both of the mating spherical surfaces 70, 72 could be formed with a relief area(s) such as a flat to facilitate assembly.

Figure 11:
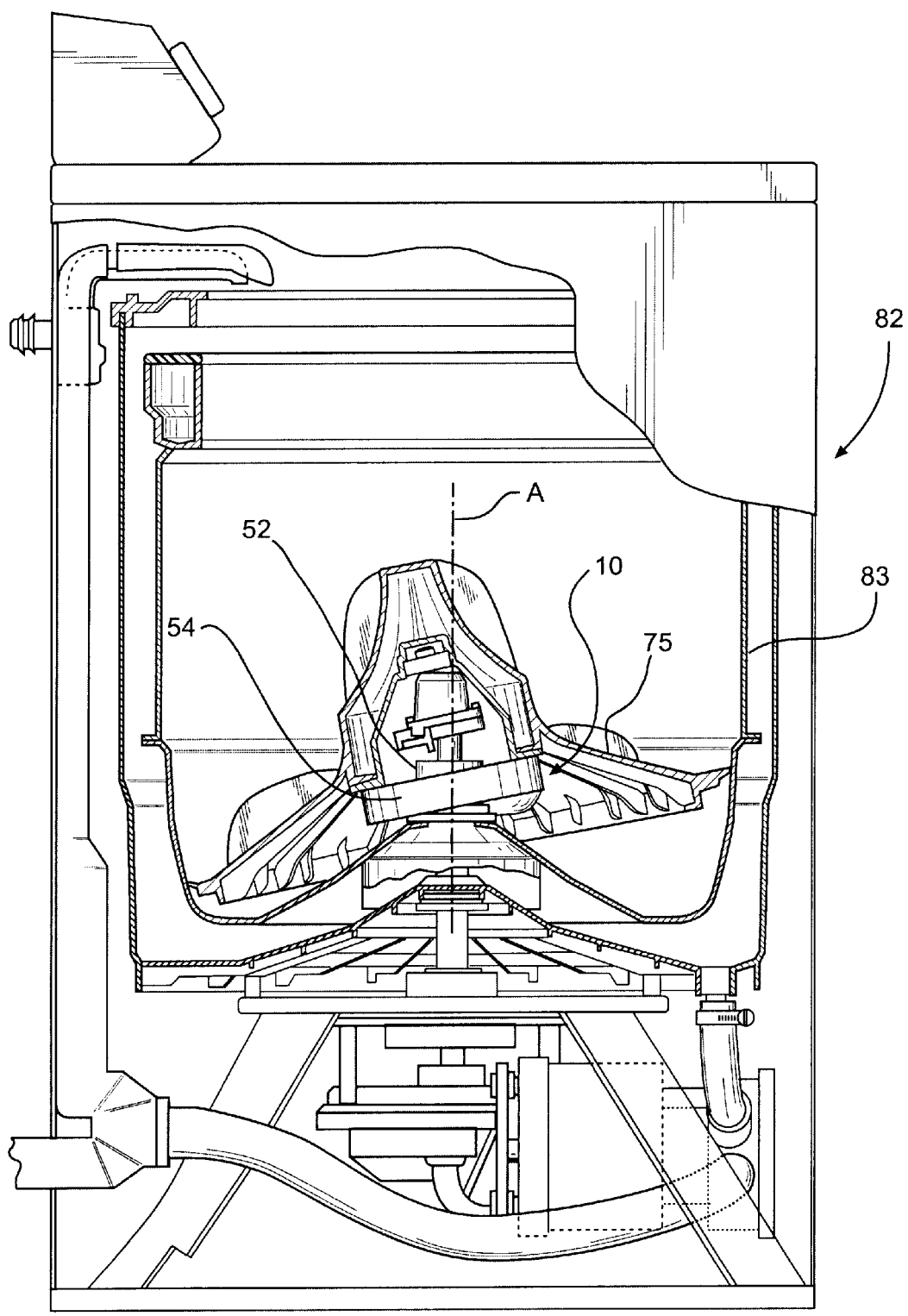
FIG. 11 is a schematic elevation view, shown partially broken away and in section, of an automatic washing appliance incorporating the wobble joint of FIGS. 4–10.

FIG. 11 shows the wobble joint 50 incorporated as a component of a vertical axis washing machine assembly or appliance 82, of the type disclosed in U.S. Pat. No. 6,115,863 (the '863 patent), the disclosure of which is incorporated herein by reference. The wobble joint 50 takes the place of the U-joint assembly illustrated in FIG. 4 of the '863 patent and serves to support the wash plate 75 for wobbling action without rotation relative to the wash drum or basket 83. The invention contemplates the incorporation of the subject wobble joint 50 (also wobble joint 10) into such washing machine devices for supporting a wobbling wash plate 75.

What is claimed is:

1. A wobble joint comprising:

an outer joint member having a curved sliding surface;

an inner joint member having a curved sliding surface;

an intermediate joint member disposed between said inner and outer joint members having an outer curved sliding surface supporting said curved sliding surface of said outer joint member for relative pivotal movement of said outer and intermediate joint members, and an inner curved sliding surface supporting said curved sliding surface of said inner joint member for relative pivotal movement of said inner and intermediate joint members;

one of said inner and outer joint members being fixed against pivotal movement and defining an axis of said joint;

mutually engaging motion limiting features acting between said intermediate joint member and each of said inner and outer joint members and restricting said relative pivotal movement of said outer and intermediate joint members to pivotal movement in a first plane containing said axis, and restricting said relative pivotal movement of said intermediate and inner joint members to pivotal movement within a second plane containing said axis and disposed transverse to said first plane; and wherein said motion limiting features include first and second arcuate grooves extending parallel to said first and second planes and retainers captured in said grooves and relatively moveable therealong.

2. The wobble joint of claim 1 wherein said retainers comprise ribs.

3. The wobble joint of claim 1 wherein said joint members include central openings registered with on another along said axis.

4. The wobble joint of claim 3 wherein said grooves extend across said openings.

5. The wobble joint of claim 1 wherein said first and second grooves lie in said first and second planes, respectively.

6. The wobble joint of claim 1 wherein said intermediate joint is disposed axially between and separates said inner and outer joint members.

7. The wobble joint of claim 1 wherein said intermediate joint is disposed radially between and separates said inner and outer joint members.

8. The wobble joint of claim 1 wherein said curved sliding surfaces are part-spherical in shape.

9. An automatic washing appliance, comprising:

a wash basket;

a wash plate disposed within said wash basket; and a power driven wobble joint comprising an inner joint member supported against pivotal movement and having a curved sliding surface, an outer joint member having a curved sliding surface and mounting said wash plate, an intermediate joint member disposed between said inner and outer joint members and having an outer curved sliding surface supporting said curved sliding surface of said outer joint member for relative pivotal movement of said outer and intermediate joint members and an inner curved sliding surface supporting said curved sliding surface of said inner joint member for relative pivotal movement of said inner and intermediate joint members, mutually engaging motion limiting features acting between said intermediate joint member and each of said inner and outer joint members and restricting said relative pivotal movement of said outer and intermediate joint members to pivotal movement in a first plane containing said axis, and restricting said relative pivotal movement of said intermediate and inner joint members to pivotal movement within a second plane containing said axis and disposed transverse to said first plane to enable said outer joint member and thus said wash plate to gyrate with wobbling action about a fixed axis of said inner joint member, and wherein said motion limiting features include first and second arcuate grooves extending parallel to said first and second planes and retainers captured in said grooves and relatively moveable therealong.

10. The automatic washing appliance of claim 9 wherein said retainers comprise ribs.

11. The automatic washing appliance of claim 9 wherein said joint members include central openings registered with on another along said axis.

12. The automatic washing appliance of claim 11 wherein said grooves extend across said openings.

13. The automatic washing appliance of claim 9 wherein said first and second grooves lie in said first and second planes, respectively.

14. The automatic washing appliance of claim 9 wherein said intermediate joint is disposed axially between and separates said inner and outer joint members.

15. The automatic washing appliance of claim 9 wherein said intermediate joint is disposed radially between and separates said inner and outer joint members.

16. The automatic washing appliance of claim 9 wherein said curved sliding surfaces are part-spherical in shape.

* * * * *